(12) United States Patent
Cady et al.

(10) Patent No.: US 10,963,476 B2
(45) Date of Patent: Mar. 30, 2021

(54) SEARCHING AND VISUALIZING DATA FOR A NETWORK SEARCH BASED ON RELATIONSHIPS WITHIN THE DATA

(71) Applicant: International Business Machines Corporation, Armonk, NY (US)

(72) Inventors: Kimberly Holmes Cady, Raleigh, NC (US); Scott B. Greer, Cary, NC (US); Andrew J. Lavery, Austin, TX (US); Sarah R. Plantenberg, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 14/816,596

(22) Filed: Aug. 3, 2015

(65) Prior Publication Data

US 2017/0039254 A1 Feb. 9, 2017

(51) Int. Cl.
*G06F 17/00* (2019.01)
*G06F 7/00* (2006.01)
*G06F 16/248* (2019.01)

(52) U.S. Cl.
CPC .................................. *G06F 16/248* (2019.01)

(58) Field of Classification Search
CPC ................................................ G06F 17/30554
USPC ........................................................ 707/722
See application file for complete search history.

(56) References Cited

U.S. PATENT DOCUMENTS

| | | | | |
|---|---|---|---|---|
| 5,515,487 A * | 5/1996 | Beaudet | ................ | G06T 11/206 345/440 |
| 5,812,134 A * | 9/1998 | Pooser | ................ | G06F 3/04815 715/848 |
| 6,166,739 A * | 12/2000 | Hugh | ................ | G06F 16/954 715/854 |
| 6,636,250 B1 * | 10/2003 | Gasser | ................ | G06F 3/0481 715/733 |
| 6,857,105 B1 * | 2/2005 | Fox | ................ | G06F 3/0482 715/808 |
| 7,765,212 B2 * | 7/2010 | Surendran | ............ | G06Q 10/107 707/738 |
| 8,214,764 B2 | 7/2012 | Gemmell et al. | | |
| 8,280,901 B2 * | 10/2012 | McDonald | ............ | G06F 16/248 707/766 |
| 8,358,308 B2 | 1/2013 | Robertson et al. | | |
| 8,458,115 B2 * | 6/2013 | Cai | ................ | G06F 16/353 706/52 |
| 8,661,033 B2 | 2/2014 | Leppert et al. | | |
| 8,909,619 B1 | 12/2014 | Riley et al. | | |

(Continued)

OTHER PUBLICATIONS

Ahn et al.; "Adaptive Visualization of Search Results: Bringing User Models to Visual Analytics", Information Visualization, vol. 8, Issue 3, Sep. 21, 2009, pp. 167-179.

(Continued)

*Primary Examiner* — Pavan Mamillapalli
(74) *Attorney, Agent, or Firm* — Joseph Polimeni; Edell, Shapiro & Finnan, LLC

(57) ABSTRACT

In searching data on a network, a data set is retrieved from the network based on a search query. Relationships between data of the retrieved data set are determined and a visualization representing related data of the retrieved data set based on the determined relationships is generated and presented. The data of the retrieved data set is accessed based on a selection of represented data within the visualization.

17 Claims, 6 Drawing Sheets

(56) References Cited

U.S. PATENT DOCUMENTS

| | | | |
|---|---|---|---|
| 9,672,279 B1* | 6/2017 | Cohen | G06F 16/358 |
| 2001/0042062 A1* | 11/2001 | Tenev | G06F 16/9024 |
| 2002/0055919 A1 | 5/2002 | Mikkeev | |
| 2004/0034497 A1* | 2/2004 | Shah | G06T 11/206 |
| | | | 702/127 |
| 2008/0115082 A1* | 5/2008 | Simmons | G06N 5/02 |
| | | | 715/804 |
| 2008/0222145 A1 | 9/2008 | Liu et al. | |
| 2008/0244429 A1* | 10/2008 | Stading | G06F 16/9038 |
| | | | 715/764 |
| 2009/0043797 A1* | 2/2009 | Dorie | G06F 17/3071 |
| | | | 707/999.101 |
| 2009/0300000 A1* | 12/2009 | Mackintosh | G06F 17/3053 |
| | | | 707/999.005 |
| 2012/0174023 A1* | 7/2012 | Kenemer | G06F 3/0482 |
| | | | 715/781 |
| 2013/0041896 A1 | 2/2013 | Ghani et al. | |
| 2013/0212093 A1 | 8/2013 | Chitiveli et al. | |
| 2014/0188935 A1* | 7/2014 | Vee | G06Q 50/01 |
| | | | 707/771 |
| 2014/0195515 A1 | 7/2014 | Baker et al. | |
| 2014/0280056 A1 | 9/2014 | Kelly | |
| 2014/0282175 A1* | 9/2014 | Smith | G06F 16/248 |
| | | | 715/771 |
| 2014/0297679 A1 | 10/2014 | Beisiegel et al. | |
| 2015/0032728 A1* | 1/2015 | Rozich | G06F 3/0484 |
| | | | 707/722 |
| 2015/0242510 A1* | 8/2015 | Shapira | G06F 8/61 |
| | | | 707/706 |
| 2015/0254370 A1* | 9/2015 | Sexton | G06F 19/00 |
| | | | 707/798 |
| 2017/0235466 A1* | 8/2017 | Tanwir | G06F 3/0481 |
| | | | 715/738 |

OTHER PUBLICATIONS

IP.Com et al.; "Visualized Search Criteria/Results", IPCOM000014267D, Oct. 29, 2002, pp. 1-2.

Hoeber et al.; "Exploring Web Search Results by Visually Specifying Utility Functions", Web Intelligence, IEEE/WIC/ACM International Conference on, Nov. 2-5, 2007, pp. 650-654.

Li, Dan Laura; "InfoPlanet: Visualizing a Semantic Web to Improve Search Results Through Exploration and Discovery", Professional Communication Conference (IPCC), 2012 IEEE International Conference on, Oct. 8-10, 2012, pp. 1-7.

Kules et al., "Categorizing Web Search Results into Meaningful and Stable Categories Using Fast-Feature Techniques", JCDL'06, Jun. 11-15, 2006, Chapel Hill, North Carolina, USA, 10 pages.

"OWL Web Ontology Language Semantics and Abstract Syntax", W3C Recommendation Feb. 10, 2004, 29 pages.

Wang et al., "Learn from Web Search Logs to Organize Search Results", SIGIR'07, Jul. 23-27, 2007, Amsterdam, The Netherlands, 8 pages.

"IBM Watson Ushers in a New Era of Data-Driven Discoveries", IBM News room, Aug. 28, 2014, 7 pages.

* cited by examiner

SEARCHING AND VISUALIZING DATA FOR A NETWORK SEARCH BASED ON RELATIONSHIPS WITHIN THE DATA

1. TECHNICAL FIELD

Present invention embodiments relate to searching and, more specifically, to searching and presenting a visualization for data for a network search based on relationships with the data.

2. DISCUSSION OF THE RELATED ART

Although web-based information is often interconnected with other information, web-based information is arbitrarily partitioned into web pages and the web lacks a system for fine-grained addressing of individual bits of information. Consequently, in order to find relevant information, many web searches drill into the web based on keywords and search for results that match the keywords. The results provided by these searches do not allow users to see the interconnected nature of their search results and, instead, users must examine search results in terms of the pages containing the information they seek. In other words, many modern web search experiences are entirely modal, insofar as a user must search for something, browse the results to find the web page which best provides the information being sought, and navigate to that page. At least due to the modal nature of searches, users cannot manipulate the search results by manipulating the connections among the results. Moreover, the modal nature of searches frequently leads users to a remote corner of the web when conducting a simple search and makes it difficult for a user to see relationships or connections between information included on different web sites.

Additionally, search results are frequently controlled entirely by the search engine and a web site can only influence a search engine in a limited number of ways, such as through a web robot protocol (e.g., a robots.txt file) and search engine optimization ("SEO"). A search engine may web crawl (e.g., brute force downloading of all web pages unless "forbidden" by a site's robots.txt file), index pages to make them searchable, and search with results containing page snippets ordered by proprietary money-making schemes and injected ads. In some instances, a search engine may also create or utilize filter bubbles to attempt to personalize search results for a user based on knowledge of a particular user, further exercising control over the information provided to the user. However, many search engines do not allow a user to manipulate search results for the user's purposes.

SUMMARY

According to one embodiment of the present invention, a data set is retrieved from the network based on a search query. Relationships between data of the retrieved data set are determined and a visualization representing related data of the retrieved data set based on the determined relationships is generated and presented. The data of the retrieved data set is accessed based on a selection of represented data within the visualization.

BRIEF DESCRIPTION OF THE DRAWINGS

Generally, like reference numerals in the various figures are utilized to designate like components.

DETAILED DESCRIPTION

Figure 1:
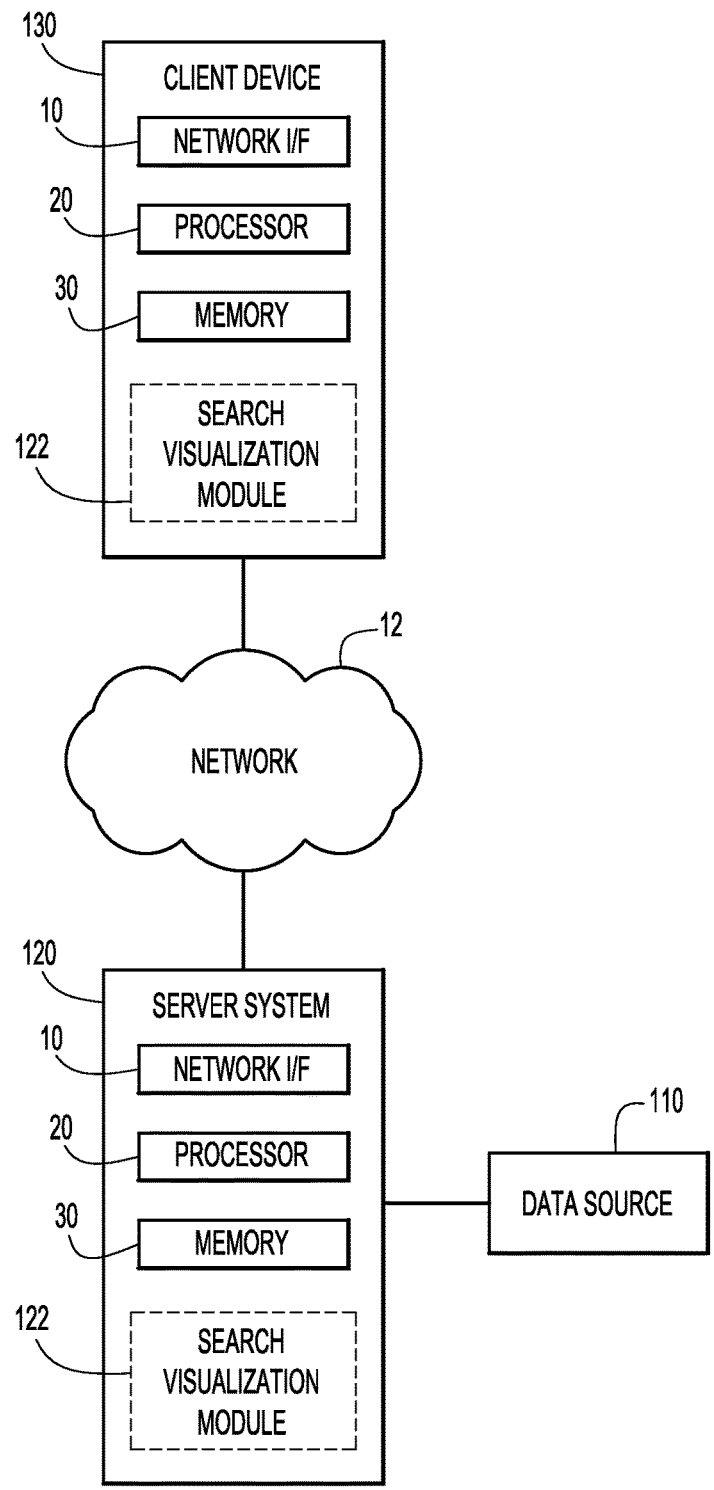
FIG. 1 illustrates an example environment in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Generally referring to the FIGS. 1-6, present invention embodiments provide a search-based user experience that redefines how search criteria relate to results, how results are presented to a user and how a user manipulates the results. More specifically, present invention embodiments are configured to retrieve a data set from a network, determine relationships between data of the data set, and generate and present a visualization representing the data and the relationships therebetween. Present invention embodiments also manipulate the visualization of search results based on user inputs and/or relationships between information found in the search.

Still referring generally to FIGS. 1-6, the visualization enables a user to select different categories or relationships in order to access data, which may be from multiple web pages and, thus, provides a user with more power to organize their search, as compared to traditional search methods. For example, the visualization enables a user to easily access data that fits their search goals, allows a user to understand the relationship among their results, and allows a user to manipulate the search results to complete their search without traversing a myriad of non pertinent web pages. As is discussed in detail below, when the visualization is manipulated, related portions of the search results may be expended, contracted, or further explored based on relationships between the data. Moreover, present invention embodiments may anticipate the eventual emergence of the "semantic web," in which information is organized in terms of content and relationships rather than somewhat arbitrarily partitioned into text-based web pages.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a search visualization module 122. The search visualization module 122 may be implemented across plural server systems. Alternatively, the search visualization module 122, or at least a portion thereof, may reside on a client system 130 for use with an interface of the client system 130. Client systems 130 enable users to communicate with the server system 120 (e.g., via network 12). The client systems may present any graphical user interface (e.g., GUI, etc.) or other interface (e.g., command line prompts, menu screens, etc.), such as the user interfaces described below with regards to FIGS. 3-6, to receive commands from users and interact with the search visualization 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software.

The search visualization module 122 may include one or more modules or units to perform the various functions of present invention embodiments described below. The search visualization module 122 may be implemented by any combination of any quantity of software and/or hardware modules or units, and/or may reside within memory 30 of a server system and/or client systems for execution by processor 20.

Figure 2:
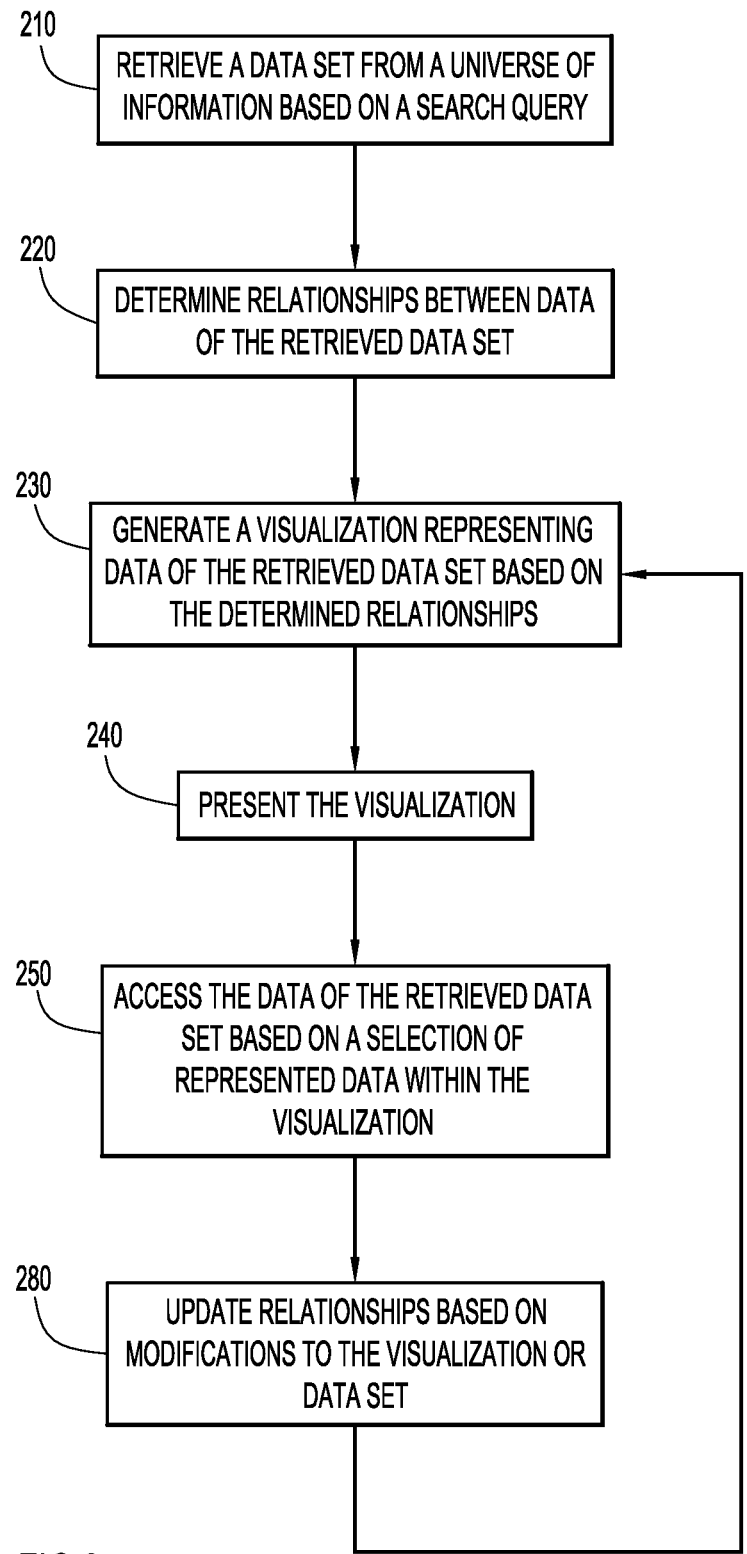
FIG. 2 is a procedural flow chart of searching and visualizing data for a network search according to a present invention embodiment.

A manner of acquiring and publishing supplemental information for a network site (e.g. via search visualization module 122, server system 120 and/or client system 130) according to an embodiment of the present invention is illustrated in FIG. 2. Initially, a data set is retrieved from a universe of information, such as a network of information, based on a search query at step 210. In some embodiments, a "universe" of all information is searched based on a user's search criteria. For instance, a user's initial search query might be "International Culture Festival" and a data set relating to any aspect of an international culture festival may be retrieved from the universe of information. For the purposes of this application, a universe is an information space. A universe spans some amount of knowledge and may be constantly modified and updated. A universe may also be self-organizing around some purpose or amount of information and may contain a portion of another universe, and/or clusters of information (e.g., sub-universes). Universes may be considered enmeshed when they span related information.

At step 220, relationships between data included in the data set may be determined. For example, data may be sorted or clustered into groups or clusters and the various groups or clusters may be linked together by shared data. Relationships within groups and among groups may also be exposed or preserved. Additionally, relationships may be determined or refined as the search results are manipulated. The potential for clustering arises naturally from the search results, meaning that the logical organization that naturally emerges from the search results as a user manipulates the data included in the results, presumably to refine and organize the data in the search results, provides a means of grouping and presenting the data included in the search results. For example, a search for "International Culture Festival" may provide a data set that may be initially sorted into eight high level groups: cultures, performances, time and location, amusement rides, food, celebrity guests, events for kids, and concerts. Then, as the data is manipulated, these high level groups (e.g., clusters) may be refined, expanded, deleted, etc., as is described in more detail below.

In order to determine relationships, a myriad of natural language processing systems, semantic search engines, clustering techniques and other such technology may be utilized. For example, a semantic search engine can be used to explore relationships expressed in semantic content by Web Ontology Language ("OWL") could be utilized. Similarly, technology that processes natural language and finds connections between information, such as IBM WATSON, could be used to discover relationships and/or uncover relationships that exist among the information. As yet another example, data may be categorized into clusters by evaluating metadata and comparing the metadata with credible knowledge sources.

Figure 3:
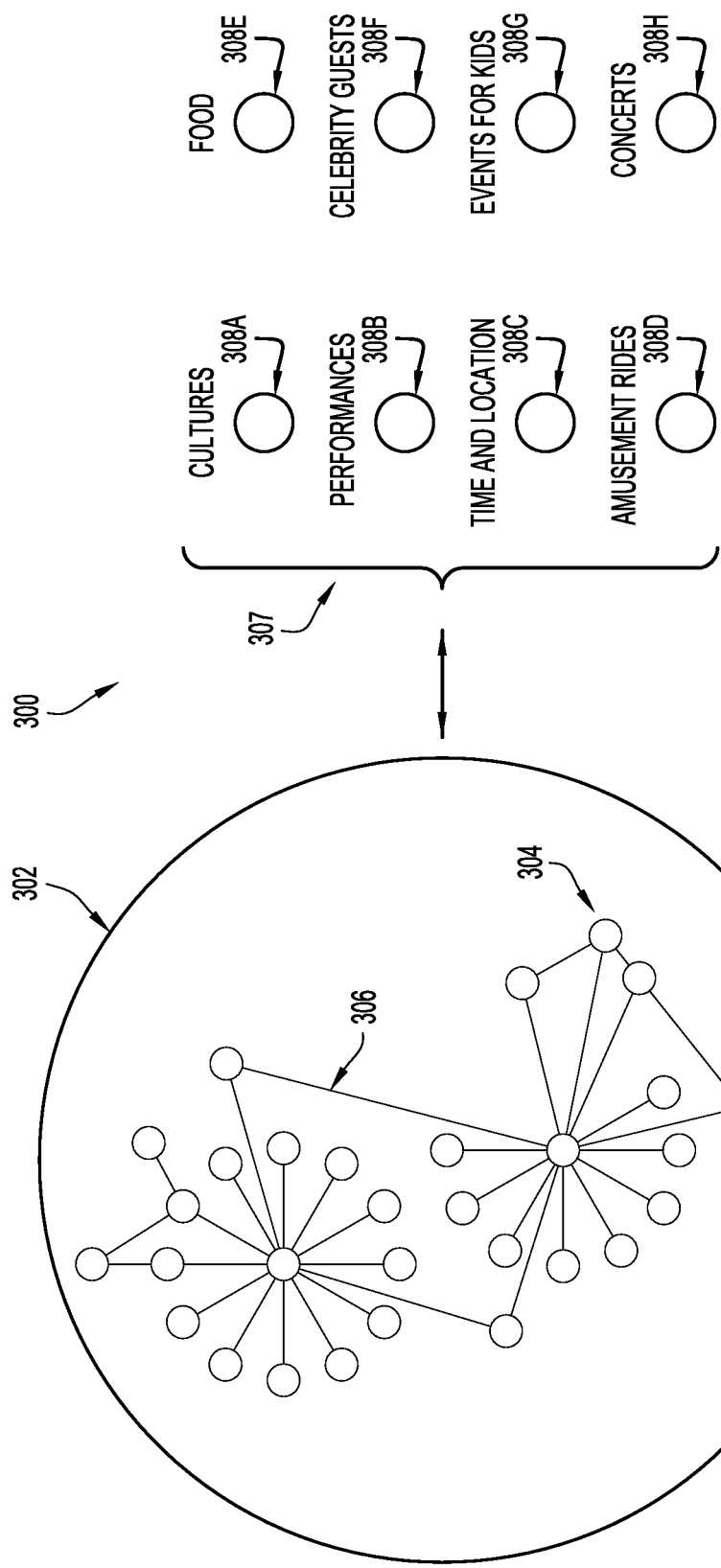
FIG. 3 is a screen shot of an example visualization representing related data of a retrieved data set based on determined relationships according to a present invention embodiment.
Figure 4:
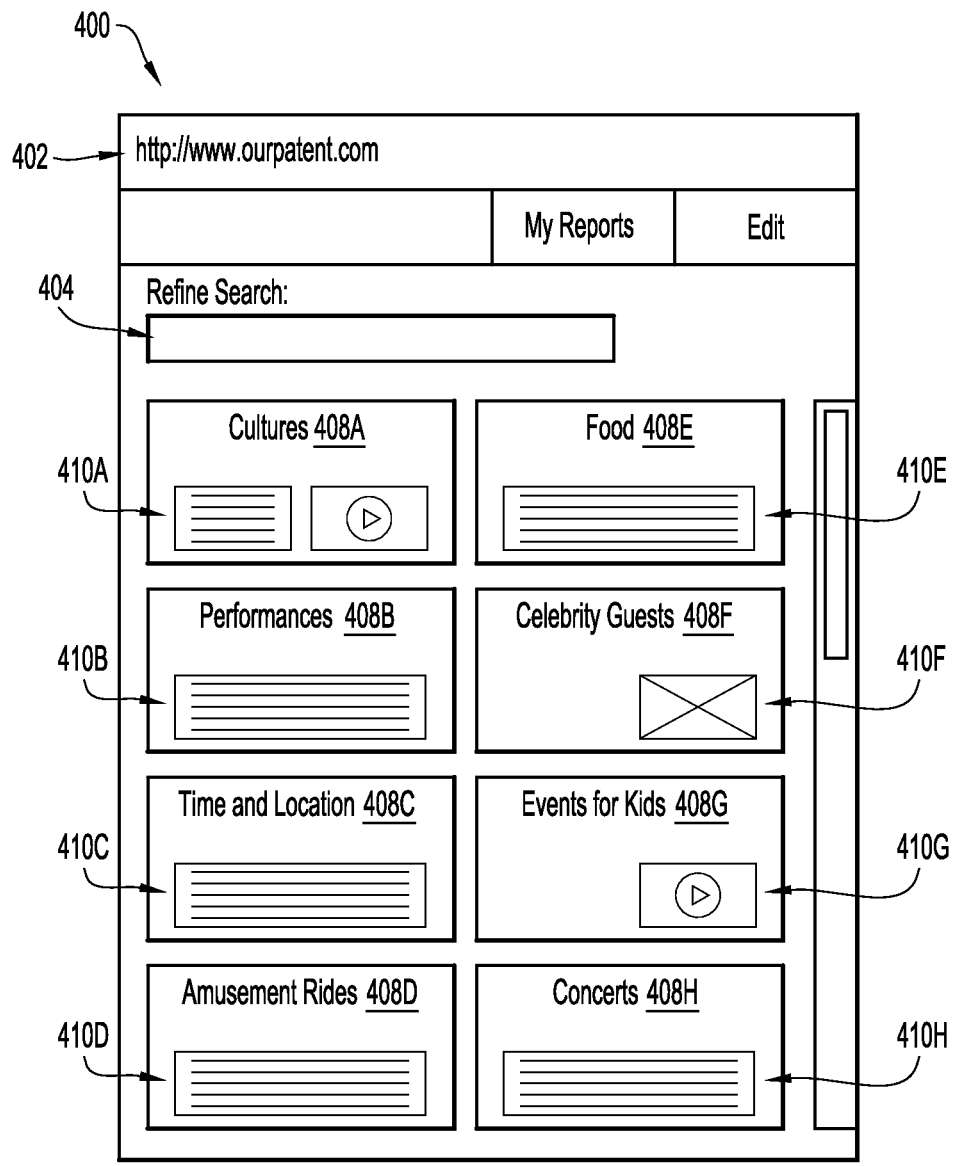
FIG. 4 is a screen shot of another example visualization representing related data of a retrieved data set based on determined relationships according to a present invention embodiment.

Based upon the determined relationships, a visualization representing data of the retrieved data set may be generated at step 230 and presented at step 240. Examples of visualizations are shown in FIGS. 3-4, however, it is to be understood that these examples are not limiting and the visualization may be any visualization that illustrates the interconnectedness of the data included in the retrieved data set (e.g., the relationships between the data). In other words, the visualization presented at step 240 presents content (e.g., data) included in the search results (e.g., the retrieved data set) that are returned in response to the search query that is initially input at step 210. The visualization sorts the content by topic, cluster, or any other such grouping, such that a user may view relevant content and see relationships between the content instead of simply viewing a list of web pages that may contain relevant content.

At step 250, data, such as additional content from a web page in the network, is accessed based on a selection of the represented data within the visualization. For example, when a user selects a certain category, at least of portion of each of the web pages included in that category may be accessed in order to provide additional information to the user. Different kinds of content would be made available based on the results, including videos, text, web pages, emails, and other such multimedia content.

Over time, data included on a web page in the network may be updated, altered, or otherwise modified. Similarly, as a user further defines the clusters of the visualization, perhaps by further researching a certain cluster, expanding a cluster, or further refining a cluster into sub categories or sub-clusters, the visualization may be modified. If any modifications are detected to the visualizations or data set, the relationships between the data may be updated at step 280 accordingly. For example, as a user saves a visualization on Monday morning and reloads the visualization on Tuesday afternoon, any web pages containing a portion of the data represented in the visualization may be checked for modifications made between Monday morning and Tuesday afternoon when the visualization is reloaded on Tuesday afternoon. If the web pages have been modified, the data relating to this modification may be updated and the relationships pertaining to this modification may be updated accordingly. Similarly, if a user moves data, such as video content, from one cluster to another cluster, the relationships pertaining to this particular data may be updated accordingly to reflect that the moved data is related to other data in its new duster and not to data from its previous cluster.

Now turning to FIGS. 3-4, example visualizations are shown. In FIG. 3, an example visualization 300 is shown. The visualization 300 includes a graph 302 of nodes 304 that are interconnected by connectors 306 and a collection 307 of clusters or sub-universes 308A-H, each sub-universe 308A-H being representative of a portion of the graph 302. In the graph 302, the connectors 306 show any relationships and associations between the nodes 304, each of which represents a web page or data included in a web page that as retrieved in response to a search query. By visualizing the relationships, visualization 300, and in particular graph 302, may allow a user to explore results based on at least the interconnectedness of the data.

As mentioned, each of the clusters 308A-H may include a portion of the graph 302. In fact, in some embodiments, each cluster 308A-H may be represented by an icon that includes the relevant nodes 304 and connectors 306 of graph 302. As an example, for the aforementioned example search of "International Culture Festival" a cluster may be provided for each of the eight high level groups: a cultures cluster 308A, a performances cluster 308B, a time and location cluster 308C, an amusement rides cluster 308D, a food cluster 308E, a celebrity guests cluster 308F an events for kids cluster 308G, and a concerts cluster 308H. In some embodiments, each cluster may be selectable and may allow a user to focus on a particular part or parts of the graph 302 in order to explore how the various clusters 308A-H are related. Moreover, focusing in on a cluster 308A-H may provide more information regarding the particular topic, perhaps by providing sub-universes or sub-clusters within the cluster 308A-H.

Now referring to FIG. 4 another example visualization 400 is shown. Visualization 400 also includes clusters 408A-H, however the clusters 408A-H are now presented as pods, insofar as the term "pod" simply denotes the box-like portions of visualization 400. In FIG. 4, the visualization 400 is again shown for the aforementioned example search of "International Culture Festival," and a pod is provided for each of the eight high level groups: a cultures pod 408A, a performances pod 408B, a time and location pod 408C, an amusement rides pod 408D, a food pod 408E, a celebrity guests pod 408F, an events for kids pod 408G, and a concerts pod 408H. As mentioned, each pod may include any desirable content relating to a specific topic or sub-universe of a search query. In the depicted embodiment, each pod 408A-H includes content 410A-H, respectively. More specifically, pods 408A and 408G include video content 410A and 410G, respectively, while pod 408F includes email content 410R and the remaining pods 408B-E and 408H include text content 41013-410E and 410H, respectively.

In some embodiments, the pods 408A-H may be connected with weighted lines, connectors colored borders, or other such indicators in order to show relationships between the pods. For example, related pods could be connected with a line and a heavier weight may indicate a stronger relationship. Additionally or alternatively, a user may be able to toggle between multiple visualizations, such as visualizations 300 and 400, in order to view relationships and adjusts pods or clusters for a report accordingly.

Figure 5:
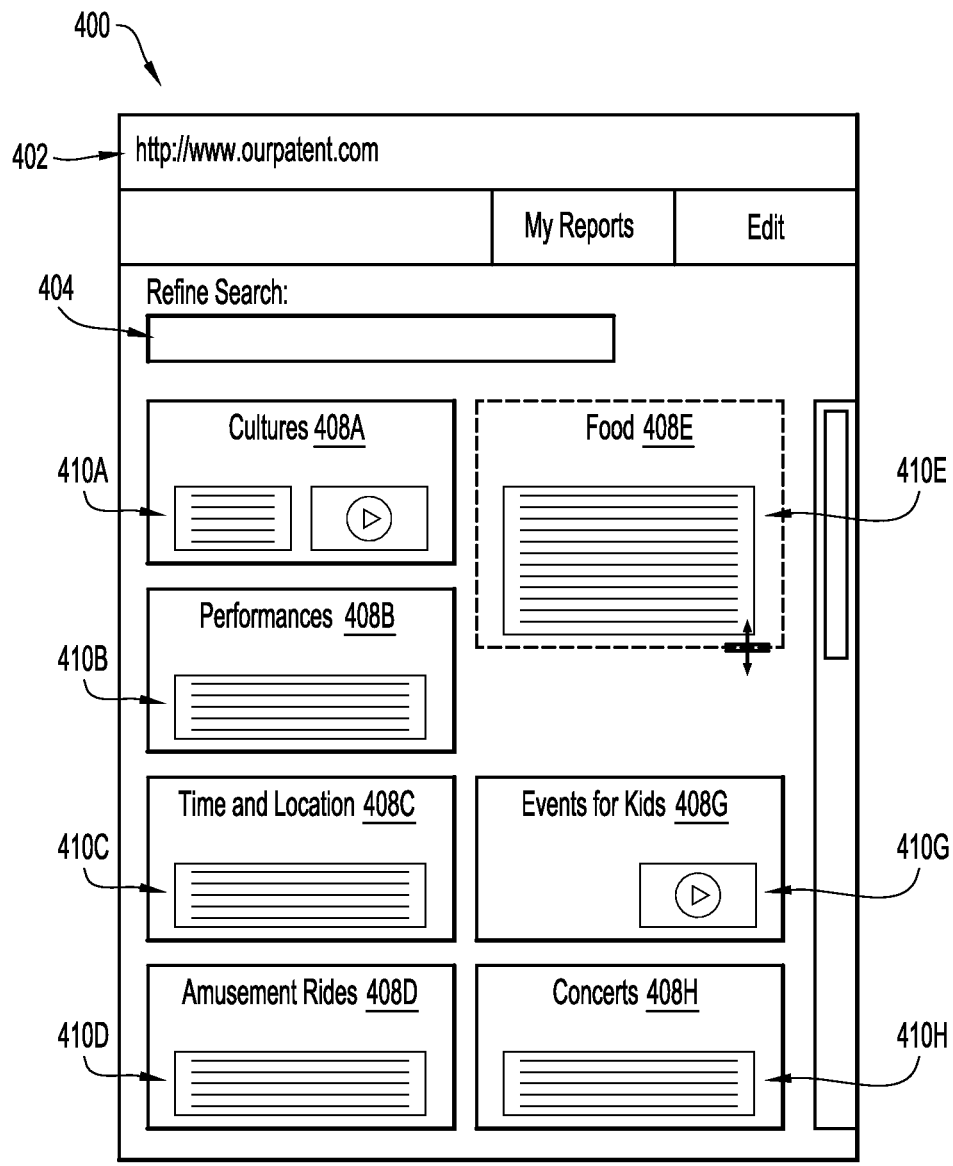
FIGS. 5-6 are screen shots of the example visualization of FIG. 4 being manipulated according to present invention embodiments.
Figure 6:
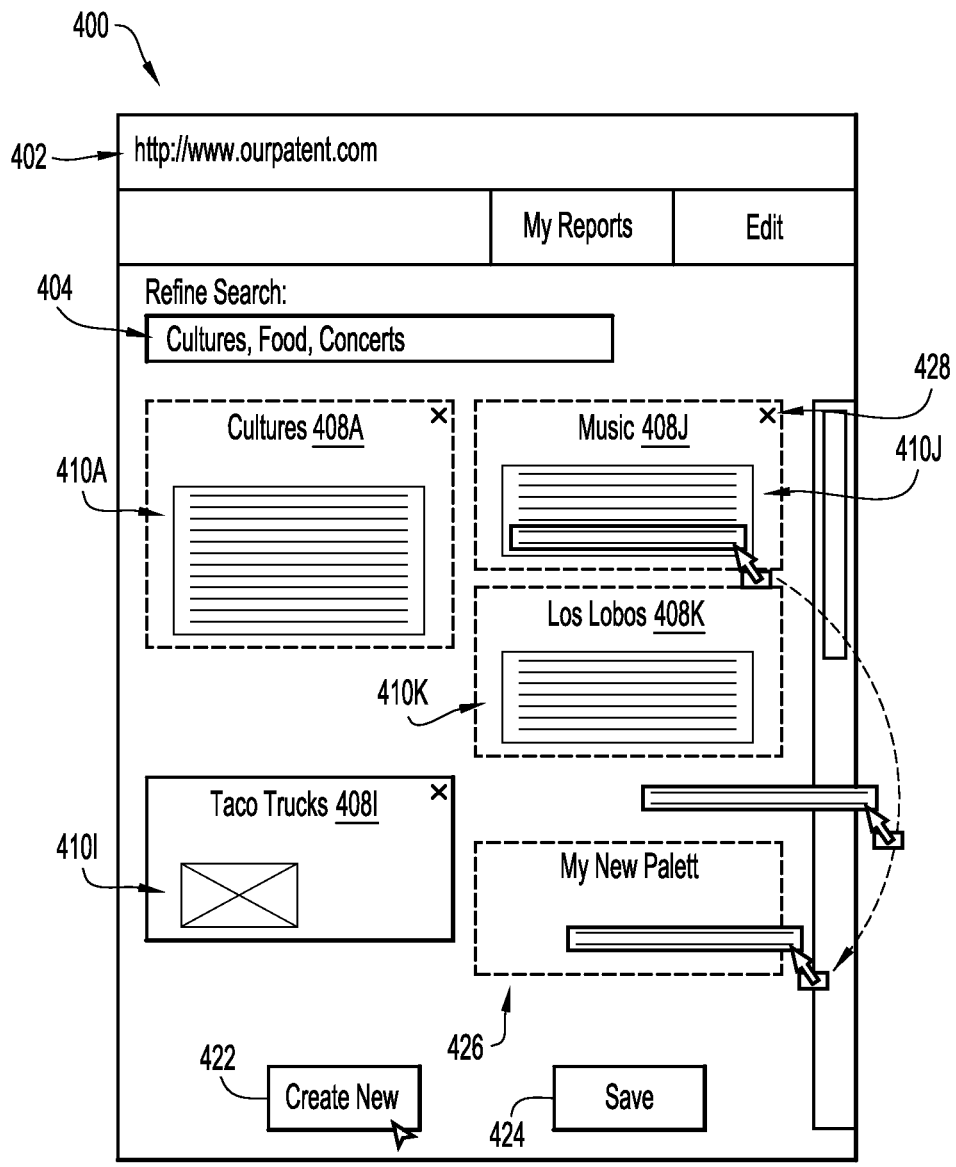

As mentioned, regardless of the specific visualization generated and presented to a user, the visualization may be manipulable to allow a user to delve further into specific topics or sub universes, expand upon certain topics, etc. FIGS. 5-6 show screen shots of visualization 400 being manipulated as an example of these manipulations. In some embodiments, when a pod 408A-H is manipulated (e.g., expanded, contracted, deleted etc.), related pods 408A-H (or sub-universes) may be adjusted accordingly. For example, any pods 408A-H that are related to a manipulated pod may be expanded while the manipulated pod is expanded. Similarly, in some embodiments, any pods 408A-H that are unrelated or minimally related to an expanded pod may be shrunk or contracted. Consequently, more content 410A-H related to an expanded cluster or topic may be accessed and/or displayed, Additionally or alternatively, new pods may be created for sub-clusters if an expanded pod includes distinct sub-clusters that are determined to be relevant due to expansion of related pods 408A-H.

As an example, in FIG. 5, the food pod 408E is expanded in order to display additional content 410E. This expansion may indicate that the user is more interested in data relating to food for the International Culture Festival as compared to the other clusters (represented by pods 408A-D and 408F-H). Consequently, it may be determined that the user may also be interested in strongly interconnected pods, such as the cultures pod 408A. Thus, when the food pod 408E is expanded, the cultures pod 408A may be expanded or highlighted if the food pod 408E and the culture pod 480A clusters are determined to be highly connected. In other words, if the determined relationships between food content 410E and cultures content 410A indicate that this data is interconnected, the cultures content 410A may be expanded and accessed when the food content 410E is expanded and accessed. Additionally or alternatively, if the food pod 408E is expanded the pod 408E may be automatically divided into multiple pods representing sub-clusters (e.g. subtopics) if there are several distinct clusters within the food pod 408E that the user may want to explore, such as "Organic Food", "Gluten Free", and "Vegan".

Moreover, manipulations of a visualization may also indicate a lack of interest in a particular aspect of the results. For instance, in the manipulated visualization 400 shown in FIG. 5, the celebrity guests pod 408F is deleted. Deleting a pod 408A-H may indicate that certain topics, clusters, or sub-clusters are not of interest to the user, which may allow the visualization to be further refined and may remove or limit access to any such data from the retrieved data set. In other words, any of the pods 408A-H may be manipulated in order to limit access to data, or portions of data, from the retrieved data set. For example, in FIG. 5, deleting celebrity pod 408F resulted in a reduction in size in the concerts pod 408H because the concerts pod 408H was highly connected to the celebrity guests pod 408F and, thus, the amount of content related to celebrities included in the visualization 400 was limited.

Still referring to FIGS. 5-6, but now with particular reference to FIG. 6, in any desired visualization, a user may further refine the results with queries within the data set, within a pod, or within a selected set of pods. For example, in some embodiments, the visualization 400 may include a search field 404 that can receive a search query. When a query is received in the search field 404, the query may be applied to the entire data set (e.g., the data set that was returned in response to the initial query). Thus, if the query "2015" is received in search field 404, the full set of content 410A-H may be filtered to year 2015. Additionally or alternatively, any number of pods 408A-H may be selected and the search may only be applied to the selected pods. Still further, an additional or sub-query may simply include selecting a number of pods 408A-E for further investigation.

In some embodiments, pods may be selected or edited by simply clicking or manipulating the desired pods. However, in other embodiments, the visualization may include an edit mode that may be entered by selecting an edit button 420. As shown in FIG. 6, once the edit button 420 is selected, each pod may be moved around the visualization 400 and a quick delete button 428 may be included on each pod. Additionally, the visualization may allow a user to create a new pod by selecting a "create new" button 422.

In FIG. 6, the visualization 400 is shown after the edit button 420 was selected while cultures pod 408A, food pod 408E, and concerts pod 408H were selected. In FIG. 6, new pods 408I, 408J, and 408K have been created, each including content 410I-410K, respectively and another new pod 426 is shown ready to be inserted. However, as mentioned above, new pods need not be created by the user and may be created when a specific pod is further developed, perhaps by expanding a pod and revealing sub-universes included in the pod. Foe example, in FIG. 6, pod 408I relates to food and may have been created when food pod 480E was selected for further searching. Similarly, music pod 410J and los lobos band pod 410K may have been created when concerts pod 408H was selected for further searching. By comparison, a new pod 426 may relate to any desirable content that a user desires and may be created by the user by simply inserting a search term into the new pod 426.

In some embodiments, any generated visualization, whether manipulated or not, may be saved for later access or use, perhaps by selecting a save button 424. This is particularly useful for manipulated visualizations, since each manipulated visualization is effectively an ad hoc, custom presentation of the information that best suits a user's needs. Put another way, since a visualization is a natural function of a user's search, it directly corresponds to the user's goals which led to that search. Saving the visualization allows the user to seamlessly resume their search and also allows the visualization to be seamlessly updated as retrieved data is updated at its hosted location (e.g., the web page it is retrieved from). In some embodiments, each visualization may be assigned a unique domain name 402. Consequently, a user may retrieve a saved visualization by simply entering the domain name 402 into a browser.

In view of the aforementioned features, present invention embodiments provide a number of advantages over other search mechanisms. For example, since a visualization is created and manipulated through a natural function of a search, the visualization directly corresponds to the user's goals which led to that search and may create a deliverable item (e.g., the visualization) as the user completes the search. In other words, present invention embodiments may provide a summary of search content, at a page-level, as the search is conducted. Moreover, by strongly correlating the search criteria to the retrieved search results which back the visualization, the visualization enables a user to quickly view related information without navigating multiple web pages or rerunning the same search multiple times. Instead of merely searching based on input search queries and keywords, present invention embodiments provide a non-incremental search that is influenced by both queries and interactions with the search results.

Still further, since related clusters are manipulated in response to a single user manipulation, present invention embodiments may provide a search tool that may shift with a user's shifting goals. In other words, present invention embodiment may quickly recognize what a user is searching for, even as the search is refined, shifted, or fragmented. Essentially, present invention embodiments provide a search experience that is a collaboration between search engines and the sites hosting the relevant content, as opposed to ceding frill control to a search engine.

It will be appreciated that the embodiments described above and illustrated in the drawings represent only a few of the many ways of implementing embodiments for searching and visualizing data for a network search based on relationships within the data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., search visualization module 122) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., search visualization module 122) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., relationships, content, and visualizations). The database system may be implemented by any number of any conventional or other databases, data stores or storage structures (e.g., files, databases, data structures, data or other repositories, etc.) to store information (e.g., relationships, content, and visualizations). The database system may be included within or coupled to the server and/or client systems. The database systems and/or storage structures may be remote from or local to the computer or other processing systems, and may store any desired data (e.g., relationships, content, and visualizations).

The present invention embodiments may employ any number of any type of user interface (e.g., Graphical User Interface (GUI), command-line, prompt, etc.) for obtaining or providing information (e.g., relationships, content, and visualizations), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above. For example, in addition to network search results, present invention embodiments may be used to visualize and sort data stored in databases.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising", "includes", "including", "has", "have", "having", "with" and the like, when used in this specification, specify the presence of stated features, integers, steps, operations, elements, and/or components, but do not preclude the presence or addition of one or more other features integers, steps, operations, elements, components, and/or groups thereof.

The corresponding structures, materials acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of searching data on a network comprising:
   retrieving a data set from the network based on a search query;
   determining relationships between data of the retrieved data set, wherein the network includes an ontology language to indicate relationships between data;
   generating and presenting a visualization representing related data of the retrieved data set based on the determined relationships, wherein the visualization comprises data of the retrieved data set sorted into a plurality of groups based on the determined relationships between the data;
   manipulating a portion of the visualization to access desired data, indicated by a user selection, from the retrieved data set, wherein manipulating the visualization comprises expanding a first plurality of other portions of the visualization that contain data related to the desired data, and contracting a second plurality of other portions of the visualization that contain data unrelated to the desired data, wherein the second plurality of other portions does not include any portions of the first plurality of other portions, wherein the first plurality of other portions and the second plurality of other portions do not include the desired data, wherein the expanding and contracting are performed together in response to the user selection and the expanding is based on the desired data indicated by the user selection and the contracting is based on the undesired data, and wherein the data related to the desired data is identified and distinguished from the data unrelated to the desired data based on the determined relationships between data that are indicated by the network; and
   accessing the data of the retrieved data set based on a selection of represented data within the visualization.

2. The method of claim 1, wherein manipulating the visualization comprises:
   receiving a second search query and applying the second search query against the retrieved data set to access desired data within the retrieved data set.

3. The method of claim 1, wherein the manipulated visualization is associated with search criteria for accessing the desired data, and the method further comprises:
   retrieving an updated data set from the network based on the search criteria associated with a prior manipulated visualization; and
   updating the visualization based on data within the updated data set.

4. The method of claim 1, wherein the visualization includes a graph of interconnected nodes, where each node corresponds to data within the retrieved data set, and an interconnection between a plurality of nodes represents the determined relationship between the data represented by those nodes.

5. The method of claim 1, wherein the visualization includes a plurality of categories each representing a corresponding one of the plurality of groups.

6. The method of claim 5, further comprising:
manipulating the visualization to limit access to data of the retrieved data set corresponding to certain ones of the plurality of categories.

7. A system for searching data on a network comprising:
a processor configured to:
retrieve a data set from the network based on a search query;
determine relationships between data of the retrieved data set, wherein the network includes an ontology language to indicate relationships between data;
generate and present a visualization representing related data of the retrieved data set based on the determined relationships, wherein the visualization comprises data of the retrieved data set sorted into a plurality of groups based on the determined relationships between the data;
manipulate a portion of the visualization to access desired data, indicated by a user selection, from the retrieved data set, wherein manipulating the visualization comprises expanding a first plurality of other portions of the visualization that contain data related to the desired data, and contracting a second plurality of other portions of the visualization that contain data unrelated to the desired data, wherein the second plurality of other portions does not include any portions of the first plurality of other portions, wherein the first plurality of other portions and the second plurality of other portions do not include the desired data, wherein the expanding and contracting are performed together in response to the user selection and the expanding is based on the desired data indicated by the user selection and the contracting is based on the undesired data, and wherein the data related to the desired data is identified and distinguished from the data unrelated to the desired data based on the determined relationships between data that are indicated by the network; and
access the data of the retrieved data set based on a selection of represented data within the visualization.

8. The system of claim 7, wherein, in manipulating the visualization, the processor is further configured to:
receive a second search query and apply the second search query against the retrieved data set to access desired data within the retrieved data set.

9. The system of claim 7, wherein the manipulated visualization is associated with search criteria for accessing the desired data, and the processor is further configured to:
retrieve an updated data set from the network based on the search criteria associated with a prior manipulated visualization; and
update the visualization based on data within the updated data set.

10. The system of claim 7, wherein the visualization includes a graph of interconnected nodes, where each node corresponds to data within the retrieved data set, and an interconnection between a plurality of nodes represents the determined relationship between the data represented by those nodes.

11. The system of claim 7, wherein the visualization includes a plurality of categories each representing a corresponding one of the plurality of groups.

12. The system of claim 11, wherein the processor is further configured to:
manipulate the visualization to limit access to data of the retrieved data set corresponding to certain ones of the plurality of categories.

13. A computer program product for searching data on a network, the computer program product comprising one or more computer readable storage media collectively having program instructions embodied therewith, the program instructions executable by a processor to cause the processor to:
retrieve a data set from the network based on a search query;
determine relationships between data of the retrieved data set, wherein the network includes an ontology language to indicate relationships between data;
generate and present a visualization representing related data of the retrieved data set based on the determined relationships, wherein the visualization comprises data of the retrieved data set sorted into a plurality of groups based on the determined relationships between the data;
manipulate a portion of the visualization to access desired data, indicated by a user selection, from the retrieved data set, wherein manipulating the visualization comprises expanding a first plurality of other portions of the visualization that contain data related to the desired data, and contracting a second plurality of other portions of the visualization that contain data unrelated to the desired data, wherein the second plurality of other portions does not include any portions of the first plurality of other portions, wherein the first plurality of other portions and the second plurality of other portions do not include the desired data, wherein the expanding and contracting are performed together in response to the user selection and the expanding is based on the desired data indicated by the user selection and the contracting is based on the undesired data, and wherein the data related to the desired data is identified and distinguished from the data unrelated to the desired data based on the determined relationships between data that are indicated by the network; and
access the data of the retrieved data set based on a selection of represented data within the visualization.

14. The computer program product of claim 13, wherein the program instructions that are executable by the processor to cause the processor to manipulate the visualization further comprise instructions executable by the processor to cause the processor to:
receive a second search query and apply the second search query against the retrieved data set to access desired data within the retrieved data set.

15. The computer program product of claim 13, wherein the manipulated visualization is associated with search criteria for accessing the desired data, and the program instructions further comprise instructions executable by the processor to cause the processor to:
retrieve an updated data set from the network based on the search criteria associated with a prior manipulated visualization; and
update the visualization based on data within the updated data set.

16. The computer program product of claim 13, wherein the visualization includes a graph of interconnected nodes, where each node corresponds to data within the retrieved data set, and an interconnection between a plurality of nodes represents the determined relationship between the data represented by those nodes.

17. The computer program product of claim 13, wherein the visualization includes a plurality of categories each representing a corresponding one of the plurality of groups; and wherein the program instructions further comprise instructions executable by the processor to cause the processor to manipulate the visualization to limit access to data of the retrieved data set corresponding to certain ones of the plurality of categories.

* * * * *